United States Patent [19]
Ostertag et al.

[11] Patent Number: 4,948,631
[45] Date of Patent: Aug. 14, 1990

[54] PREPARATION OF PARTICULARLY BLUISH PEARL LUSTER PIGMENTS

[75] Inventors: Werner Ostertag, Gruenstadt; Norbert Mronga, Dossenheim; Ulrich Graessle, Boehl-Iggelheim, all of Fed. Rep. of Germany

[73] Assignee: BASF Aktiengesellschaft, Ludwigshafen, Fed. Rep. of Germany

[21] Appl. No.: 321,109

[22] Filed: Mar. 9, 1989

[30] Foreign Application Priority Data

Mar. 11, 1988 [DE] Fed. Rep. of Germany ....... 3808070

[51] Int. Cl.⁵ .............................................. B05D 7/00
[52] U.S. Cl. .................................... 427/208; 106/417
[58] Field of Search ......................... 102/417; 427/218

[56] References Cited

U.S. PATENT DOCUMENTS 4,623,396 11/1986 Kimura et al. ...................... 106/291

FOREIGN PATENT DOCUMENTS 3433657 3/1985 Fed. Rep. of Germany .
58-164653 5/1983 Japan .
59-126468 7/1984 Japan .
58-184570 9/1985 Japan .

OTHER PUBLICATIONS

H. B. Weiser, "The Journal of Physical Chemistry", vol. 45, pp. 1227–1234, ('41).

Primary Examiner—Michael Lusignan
Attorney, Agent, or Firm—Keil & Weinkauf

[57] ABSTRACT

Particularly bluish pearl luster pigments are produced by treating titanium dioxide coated mica pigments where the optical thickness of the titanium dioxide coating is from 50 to 100 nm or from 300 to 340 nm with ammonia at from 750 to 850° C. with constant agitation.

4 Claims, No Drawings

PREPARATION OF PARTICULARLY BLUISH PEARL LUSTER PIGMENTS

The present invention relates to a process for preparing particularly bluish dark pearl luster pigments by reduction of titanium dioxide coated mica pigments with ammonia.

Japanese Preliminary Published Application No. 164,653/83 discloses a process for preparing pearl luster pigments where the flakelike mica, which is coated with titanium oxide or titanium oxide hydrate, is treated in a stream of ammonia at from 600° to 950° C. The titanium dioxide layers may also additionally contain metal oxides such as $Fe_2O_3$, $ZnO$, $Al_2O_3$, $ZrO_2$, $SnO_2$, $CuO$ and $Cr_2O_3$. This reducing treatment, which according to the above-cited application gives titanium monoxide, leads to pigments whose hues range from blue or bluish to black or blackish brown, with the blacks supposedly being obtained when all the titanium dioxide has been converted into titanium monoxide.

Japanese Preliminary Published Application No. 126,468/84 likewise describes pearl luster pigments based on mica where the mica surfaces have been coated with titanium dioxide and lower titanium oxides or only with lower titanium oxides. These pigments are likewise obtained through a reducing treatment on titanium dioxide coated mica particles, for example with hydrogen. The starting materials are titanium dioxide mica pearl luster pigments which show interference colors. These interference colors depend on the thickness of the titanium dioxide layer, which may range from 20 to 200 μm. The interference colors of the starting pigments vary with the thickness of the $TiO_2$ layer from silver, gold, red, violet, blue to green. The reducing treatment is said to give pigments which differ from the starting pigments by a fresher hue.

German Laid-Open Application No. DOS 3,433,657 describes a pearl luster pigment where mica platelets have been provided with a two-layered coating. The first coat, as in above-cited Japanese Patent Application No. 126,468/84, consists of lower oxides of titanium or of mixtures of these oxides with titanium dioxide. This first coat is overlaid with a second coat which consists of titanium dioxide. These pigments are said to be notable for stronger hue and pearl luster, for superior compatibility and stability and for resistance to the action of light, acids, alkalis, solvents and heat. However, they have the disadvantage that their manufacture requires an additional step compared with the starting materials.

Japanese Preliminary Published Application No. 184,570/85 finally likewise describes pearl luster pigments where mica platelets have been coated with titanium oxides or titanium oxynitrides which as in above-cited Japanese Preliminary Published Application 164,653/83, are obtained by a reducing treatment on $TiO_2$-coated mica particles with ammonia. Titanium oxides and titanium oxynitrides are understood as compounds of the formula $Ti_xN_yO_z$ where x is from 0.2 to 0.6, y from 0.05 to 0.6 and z from 0.1 to 0.9. Here too the pigments obtained have interference colors such as silver, gold, red, blue and green.

The pigments mentioned have the advantages that they do not contain any toxic components and therefore are suitable for coloring cosmetics, that they are thermally stable, and that they are highly compatible with resins. However, it has been found that these pigments, if a hue other than black is desired, are difficult to manufacture reproducibly and that in particular pigments having a particularly bluish hue, ie. a hue corresponding to a CIELAB quantity $b^* \leq -10$ (measured at an angle difference of 20° to the gloss angle, standard illuminant D 65), are only producible haphazardly, if at all.

It is an object of the present invention to prepare pearl luster pigments having a particularly bluish hue in a reproducible manner by reduction of titanium dioxide coated mica pigments with ammonia at elevated temperatures.

We have found that this object is achieved by using mica pigments whose optical layer thickness is from 50 to 100 nm or from 300 to 340 nm, performing the treatment with ammonia at from 750° to 850° C., and keeping the pigments in constant agitation throughout the reduction.

Optical layer thickness is the product of geometrical thickness and the refractive index of anatase (2.5) or rutile (2.7). $TiO_2$-coated mica particles having an optical layer thickness of from 50 to 100 nm are silvery, while those having layer thicknesses of from 300 to 340 nm show a blue interference color.

The novel treatment of $TiO_2$-coated mica particles gives a complex mixture. X-ray studies show that aside from unreduced $TiO_2$ there are present, depending on the reduction conditions, a large number of oxidic and/or nitridated titanium compounds having an oxidation number of $Ti<4$, for example lower titanium dioxides down to TiO, titanium oxynitrides and even titanium nitride. The blue color in the pigments obtained according to the invention is presumably due to oxidic titanium compounds in which the titanium is present in the trivalent state, the lightness of the pigment being affected by the presence of the dark TiO and TiN.

The bluing (CIELAB quantity $b^*$) and the darkening (CIELAB quantity $L^*$) of the reduced products are not disentangleable. However, the reduction conditions can be adjusted in such a way that there are relative intensity differences in the bluing and darkening. While the darkening increases with increasing reduction time, the bluing passes through a maximum and then comes back down again. The substantially reduced samples becoming increasingly less blue but more red.

Detailed investigation of the reduction of $TiO_2$-coated mica pigments shows that the formation of a very bluish reaction product depends on the interaction of numerous parameters and factors.

Of importance is first of all the choice of ammonia as the reducing gas, since other reducing gases such as hydrogen or carbon monoxide do not bring about such an intensive blue coloration of the reaction products. It has further been found that the use of dried ammonia is likewise of importance, since the use of moist ammonia makes the reduction much more difficult. It is therefore advantageous to use ammonia having a residual moisture content of $<0.02$ mg of $H_2O/l$ of $NH_3$. Since water forms in the course of the reducing treatment, if only in small amounts, it is advantageous to pass the gas through the reaction space at a flow velocity of not less than 1 cm/sec. It is of course also possible for the reducing ammonia to be diluted with gases which are inert toward the reaction components and products, such as nitrogen or carbon dioxide. The proportion of ammonia may be reduced down to 10% by volume.

The reduction temperature plays an important part. The onset of darkening and bluing is at as a low temperature as 400° C., while the upper limit for the reduction temperature is determined by the thermostability of the mica substrate. Mica (muscovite), depending on its provenience, shows structural instabilities from about 860° C., loses up to 4% by weight of $H_2O$ and becomes more fragile. To avoid such undesirable phenomena, it is expedient not to carry out the reduction above a maximum temperature of 860° C. To obtain particularly bluish products, the reduction is therefore carried out at from 750° to 850° C. With increasing reduction time, the darkening increases and the bluing passes through a maximum.

The duration of the reducing treatment depends on the temperature and the modification in which the $TiO_2$ is present in the coating, ie. whether it is present as rutile and/or anatase. We have found, surprisingly, that starting pigment coatings which are completely in the rutile form can be reduced more rapidly than pigments where the $TiO_2$ is present in the anatase form or is anatase mixed with rutile. In other words, under comparable conditions, rutile coated mica pigments lead more rapidly to pigments having the desired $b^*$ value of $\leq -10$ than anatase-containing coatings. This is surprising because the rutile form of titanium dioxide is the lower energy, thus significantly less reactive, modification of titanium dioxide. Preference is therefore given to using mica pigments which are coated with rutile.

The duration of the treatment according to the invention is in general from 4 to 8 hours, with temperatures in the upper part of the range from 750° to 850° C. requiring shorter reduction times, and those in the lower part longer reduction times, to give comparable results. With increasing reduction time, the degree of bluing increases and passes through a maximum, and then decreases again. At the same time the degree of darkening increases continuously, so that, if desired, the lightness of the bluish pigment may be influenced via the duration of the reduction.

Another important factor for the production of dark bluish pearl luster pigments having a $b^*$ value of $\leq -10$ (measured at a 20° angle difference to the gloss angle, standard illuminant D 65) is the crystal structure of the $TiO_2$ coating. Systematic studies have shown that coatings which are completely in the rutile form are very much faster reduced at high temperatures than anatase coatings or coatings which are only partly rutile. Rutile coated pigments are under comparable conditions always very much bluer, i.e. with larger negative $b^*$ values, than anatase coated pigments.

Remarkably bluish products are obtained on using mica pigments where the $TiO_2$, especially $TiO_2$ in the rutile form, has an optical layer thickness of from 300 to 340 nm. At these layer thicknesses, the pigment to be used shows a weakly blue interference color. While the blue interference color is hardly noticeable in the powder used, increasing reduction and darkening brings about an overproportional intensification of the blue coloration. This is ascribable to an additive effect of the interference color and the absorption color on the part of the lower titanium oxides. In the special case of blue reduced interference pigments, there is enhancement of the blue interference color and the blue absorption color of the reduced lower titanium oxides.

In the course of development work on refining the production of the particularly bluish dark pearl luster pigments, it was found that processes which make it possible for the individual pigment particles to be accessible to gas on all sides are far superior to the existing processes mentioned at the beginning, where reducing gas must diffuse into the stationary bed of the platelet-like pearl luster pigments. However, pigments in agitation in the reduction gas must not be mechanically damaged, since otherwise their optical effect is impaired. The requisite gentle treatment with reduction gas flowing substantially all around the individual particles is possible in a heated rotating tube or drum fitted out with trip strips. Similarly, fluidization of the starting pigment in a hot fluidized bed leads to a homogeneous reduction product which can be produced within comparatively short reduction times.

A further intensification of the blue color by reduction is obtained by doping the $TiO_2$ coating with foreign ions such as oxides of hexavalent tungsten, hexavalent molybdenum and/or of tetravalent tin. These foreign ions are either incorporated in the $TiO_2$ coating early on, in the course of the production of the $TiO_2$-coated mica, or made to diffuse into the $TiO_2$ coating by subsequently heating the starting material in the presence of tungsten($+6$), molybdenum($+6$) or tin($+4$) compounds.

Scanning electron micrographs show that the pigment particles do not change their outer shape during the reduction. Similarly, the particle size distribution remains virtually the same. Studies under the optical microscope reveal that the pigment particles obtained have a very homogeneous hue. Suitable starting materials are all $TiO_2$-coated mica substrates preparable in a conventional manner, as described for example in U.S. Pat. Nos. 3,087,028, 3,087,829 and 4,038,099, German Laid-Open Application No. DOS 2,214,545, EP Application 45,851 and in the Pigment Handbook, Wiley Interscience, vol. 1, pages 829 et seq. (1987).

The particularly bluish dark pearl luster pigments find application in the pigmentation of high quality paints and coatings, in particular two-fold automotive effect coatings, plastics, print pastes, decorative ceramics and cosmetic products such as powders, nail varnishes, eye shadows and the like. The pigments may be used on their own or combined with other effect pigments or colored pigments.

The examples below illustrate their relationships.

(A) The following apparatus was used in Examples 1 to 15:

Electrically heatable drum reactor made of RA4 stainless steel, 10 cm in diameter, 15 cm in length. To ensure better mixing of the product, the reactor is equipped on the inside with six trip strips 2 cm high extending in the longitudinal direction. The reactor has a centric opening for admitting and releasing gas. The reduction gas is introduced via a nozzle tube which dips into the reactor. Heat is supplied from the outside by placing the whole reactor inside a foldback electrically heatable nozzle furnace.

(B) To determine the CIELAB values of the products produced according to the invention, the following method was used:

2 g of the pigment are stirred into 18 g of a polyester varnish having a solids content of 21% by weight and the mixture is dispersed in a Red Devil for five minutes. This pigmented varnish is knife coated in a wet film thickness of 200 pm, onto a glass plate 2 cm in thickness. Following a 30 minutes flashoff in air, the tristimulus values are measured through the glass surface with a DATACOLOR MCS 111 spectrophotometer having a GK 111 metallic measuring head at an angle difference of 20° to the gloss angle. The reported tristimulus based values ($L^*$, $a^*$ and $b^*$) are based on the standard illuminant D 65, L* conforming to the lightness, a* to the red or green portion and b* to the blue or yellow portion.

The bluishness and darkness of the reaction products are measured and quantified with a colorimeter by the CIELAB method. The darker the sample, the lower the L* value (lightness); the bluer the sample, the larger the negative b* value.

EXAMPLES 1 TO 5

The drum reactor described under (A) is charged with 200 g of a commercial silvery pearl luster pigment consisting of mica platelets from 5 to 50 μm in diameter (average diameter 14.2 μm) and from 0.1 to 0.5 μm in thickness and coated with 30.5% by weight of $TiO_2$ in the anatase form for an optical layer thickness of a $TiO_2$ layer of from 90 to 100 nm. The reactor is set in motion (30 r.p.m.), rinsed with nitrogen and heated to 600° C. or 800° C. After the temperature has been reached, the incoming gas is switched to ammonia dried over KOH (flow velocity 3.5 cm/sec, residual moisture content <0.02 mg of H2O/l of NH3), and the reduction is carried out for 30, 60, 240 or 360 minutes. The incoming gas is then switched back to nitrogen until the reactor, which continues to rotate, has cooled down to room temperature. Under the optical microscope, the pigments thus obtained appear as very homogeneous products where each mica particle of a charge creates the same color impression. The color is measured in accordance with the abovementioned method. The reaction parameters and results are shown in Table 1.

TABLE 1

Reduction of anatase coated mica pigment with ammonia

| Example, | Reaction temp./°C. | Reaction time/min | L* | a* | b* |
|---|---|---|---|---|---|
| (comp.) 1 | 600 | 60 | 106.1 | −1.3 | 2.8 |
| (comp.) 2 | 800 | 30 | 96.7 | −3.1 | −2.2 |
| (comp.) 3 | 800 | 60 | 95.0 | −2.9 | −2.9 |
| (comp.) 4 | 800 | 240 | 84.8 | −3.1 | −8.1 |
| 5 | 800 | 360 | 81.1 | −3.7 | −10.5 |
| null value | — | 0 | 116.9 | −1.1 | 2.9 |

Table 1 above shows that at 800° C. a particularly bluish pigment is only obtained after 6 hours.

EXAMPLES 6 TO 14

The procedure followed is similar to that of Examples 1 to 5, except that the anatase coated mica pigment is replaced by a rutile coated pigment having the same titanium content and the same particle diameter and particle thickness. Again the optical thickness of the $TiO_2$ layer is from 90 to 100 nm. Under the optical microscope, the pigments thus obtained appear as very homogeneous products where each mica particle of a charge creates the same color impression. The reaction parameters and the results of the color measurement are shown in Table 2.

TABLE 2

Reduction of rutile coated mica pigment with ammonia

| Example | Reaction temp./°C. | Reaction time/min | L* | a* | b* |
|---|---|---|---|---|---|
| (comp.) 6 | 600 | 60 | 108.0 | −2.4 | 2.8 |
| (comp.) 7 | 800 | 30 | 95.8 | −3.7 | −3.1 |
| (comp.) 8 | 800 | 60 | 93.2 | −3.9 | −4.1 |
| 9 | 800 | 240 | 73.4 | −7.1 | −15.5 |
| 10 | 800 | 360 | 60.2 | −5.2 | −13.6 |
| 11 | 825 | 60 | 84.5 | −5.8 | −13.7 |
| 12 | 825 | 240 | 76.1 | −6.4 | −17.0 |

TABLE 2-continued

Reduction of rutile coated mica pigment with ammonia

| Example | Reaction temp./°C. | Reaction time/min | L* | a* | b* |
|---|---|---|---|---|---|
| 13 | 825 | 360 | 65.9 | −3.4 | −17.0 |
| (comp.) 14 | 825 | 480 | 45.7 | 8.2 | −2.6 |
| null value | — | 0 | 110.2 | −1.3 | 2.9 |

The table shows that even a time as short as 4 hours at 800° C. gives a particularly bluish pigment which is bluer than that obtained from anatase coated mica pigments as described in Example 5 in the course of longer reduction times, namely 6 hours.

EXAMPLE 15

The drum reactor described under (A) is charged with 200 g of a commercial pearl luster pigment which has a blue interference color and consists of mica platelets from 5 to 50 μm in diameter (average diameter 14.2 μm) and from 0.1 to 0.5 μm in thickness, coated with 45.5% by weight of $TiO_2$ in the anatase form for an optical $TiO_2$ layer thickness of from 300 to 340 nm. The reactor is set in motion (30 r.p.m.), inertized with nitrogen and heated to 800° C. Once the temperature has been reached, the incoming gas is switched to a mixture of ammonia dried over KOH and dried nitrogen (with 30% by volume of ammonia - in the mixture, residual moisture content ≦0.02 mg of $H_2O/l$ of gas), and the reduction is carried out for 60 minutes. The gas mixture flows through the reactor at a velocity of 3.5 cm/sec. Thereafter the nitrogen is switched back on, and the reactor is rotated until cooled down. The pigment obtained shows a brilliant blue color of high saturation. Under the optical microscope, the product obtained looks very homogeneous with every mica particle creating the same color impression. The following colorimetric values are measured:

|  | L*: 63.6 | a*: −4.6 | b*: −42.8 |
|---|---|---|---|
| null sample | L*: 86.7 | a*: −2.5 | b*: 14.6 |

EXAMPLE 16

The experiment is carried out similarly to Example 15, except that the anatase coated mica pigment is replaced by a rutile coated pigment of the same titanium content and the same particle diameter and particle thickness. Similarly, the optical thickness of the $TiO_2$ layer is from 300 to 340 nm. The product obtained shows an extremely brilliant blue color of high saturation. Under the optical microscope, the product obtained looks very homogeneous with every mica particle creating the same color impression. The following colorimetric values are measured:

|  | L*: 76.2 | a*: −5.7 | b*: −44.8 |
|---|---|---|---|
| null sample | L*: 131 | a*: −1.1 | b*: 2.0 |

EXAMPLE 17

This experiment is carried out with $TiO_2$-coated mica pigment (16.4% by weight of Ti) having an average particle size, determined by Cilas granulometry, of 22.4 μm. Over 95% of the particles are from 12 to 48 μm in size. The $TiO_2$ coating has a rutile structure and has been doped with $Sn^{+4}$ (0.7% by weight of $Sn^{+4}$ based on the total weight of the pigment). The optical layer thickness of the $TiO_2$ layer is from 90 to 100 nm.

15 kg of this pigment are introduced into an externally heated drum 1 m in length and 0.3 m in diameter lined with four 2 cm trip strips and are heated to 800° C. under $N_2$.

The drum is then subjected at 27 r.p.m. to a 600° C. flow of $NH_3$ (residual moisture content $\leq 0.02$ mg of $H_2O$/l of $NH_3$, flow velocity 3.5 cm/sec) for 6 hours. The drum is then cooled down under nitrogen.

The product has a deep bluish black luster. Following reduction, it has an average particle size, determined by Cilas granulometry, of 22.8 μm. Under the microscope the platelets give a homogeneous color impression.

The colorimetric values are:

$L^*$: 69.489    $a^*$: −5.171    $b^*$: −20.515

| null sample: | $L^*$: 130 | $a^*$: −1.2 | $b^*$: 1.9 |
|---|---|---|---|

We claim:

1. A process for preparing a particularly bluish pearl luster pigment by reduction of a titanium dioxide coated mica pigment with ammonia at elevated temperatures, which comprises using a mica pigment whose $TiO_2$ coating has an optical layer thickness of from 50 to 100 nm or from 300 to 340 nm, performing the treatment with ammonia at from 750 to 850° C., and keeping the pigment in constant agitation during the reduction.

2. The process of claim 1, wherein the $TiO_2$ coating on the mica pigment used is exclusively in the rutile phase.

3. The process of claim 1, wherein the ammonia has been diluted with a gas which is inert toward the reaction components.

4. The process of claim 1, wherein the $TiO_2$ coating of the starting pigment has been doped with a compound of hexavalent tungsten, hexavalent molybdenum or tetravalent tin.

* * * * *